United States Patent [19]

Wilson

[11] Patent Number: 5,054,057
[45] Date of Patent: Oct. 1, 1991

[54] COIN BLOCKER

[76] Inventor: Clifford J. Wilson, P.O. Box 77, Fall River, Mass. 02724

[21] Appl. No.: 621,388

[22] Filed: Jan. 17, 1991

[51] Int. Cl.⁵ .............................................. H04M 17/02
[52] U.S. Cl. ...................................... 379/155; 379/450; 379/457; 40/323; 40/336; 194/353
[58] Field of Search ............. 379/150, 155, 447, 450, 379/457; 40/323, 616, 336, 27.5; 49/463, 465; 194/351, 353; 439/148

[56] References Cited

U.S. PATENT DOCUMENTS 4,801,271 1/1989 Piper .................................. 439/148

Primary Examiner—Stafford D. Schreyer
Attorney, Agent, or Firm—Barlow & Barlow, Ltd.

[57] ABSTRACT

A coin slot cover for telephones to indicate an out-of-order condition. A plate with a pair of locking tabs extending therefrom that may be inserted into the coin slot of a pay telephone.

1 Claim, 1 Drawing Sheet

COIN BLOCKER

BACKGROUND AND SUMMARY OF THE INVENTION

This invention relates to a conventional styled coin operated telephone and more particularly to a device for blocking the coin deposit slot.

There has never been in the art any device that was practical for blocking a coin slot with the unit that was out-of-order and was in need of replacement and/or repair.

The coin-block is essentially a plate which has a pair of vertical abs extending from the rear face thereof. The tabs are flexible and expand into the slot interior locking the cover plate in place. The outer face of the device will visibly indicate an out-of-order condition of the phone, preferably by means of raised molded lettering which is placed upon universally recognizable octagonal shaped face plate. The device is generally not removable by hand except by access to the interior of the housing where the tabs may be contracted towards each other releasing the cover.

DESCRIPTION OF THE PREFERRED EMBODIMENT

Figure 1:
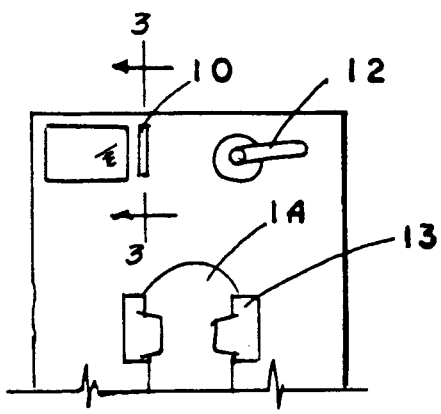
FIG. 1 is a partial front elevational view of a typical pay telephone unit.
Figure 2:
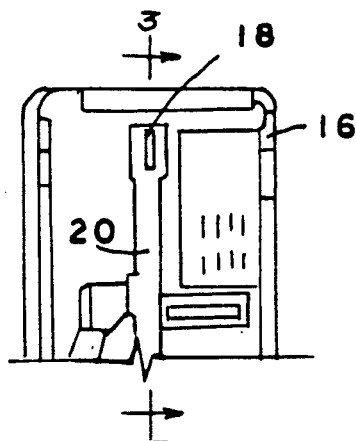
FIG. 2 is a similar view with the outside cover removed.

Referring first to FIG. 1, there is illustrated a conventional style coin operated telephone which will have a coin slot 10, a coin release level 12, together with a cradle 13 for a hand set 14. As seen in FIG. 2, the interior of a coin telephone consists of the casing 16 and within the casing is a coin slot entry port or coin acceptor 18 which leads into a coin chute 20.

Figure 3:
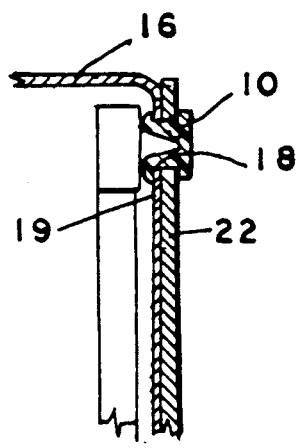
FIG. 3 is a sectional view taken substantially on lines 3—3 of FIG. 1.

Coin telephones essentially, as seen more particularly in FIG. 3, have a main box front plate 19 that is contiguous to an outer decorative face plate such as 22, which front plate 19 and face plate 22 will have a slot 10 therein that will be closely spaced on the order of 0.25" to the slot 18 which is found at the upper end of the coin chute.

Figure 4:
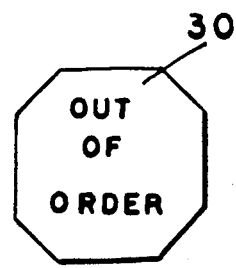
FIG. 4 is a plan view of the coin blocker made in accordance with the invention.
Figure 5:
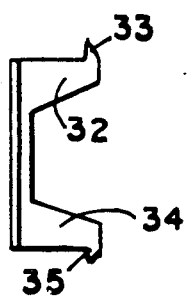
FIG. 5 is a side elevational view thereof.
Figure 6:
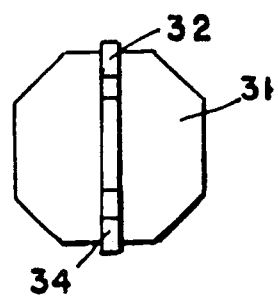
FIG. 6 is a rear view thereof.

The coin slot cover, as seen more particularly in FIG. 4, comprises essentially a plate 30 which has a bottom face 31 from which there protrudes a pair of tabs 32, 34. These tabs, as seen in FIG. 6, are substantially flat and lie in the same plane and are provided with outwardly projecting locking portions 33, 35 respectively. As seen in FIG. 3, the device is adapted to be inserted into the coin slot 10 and 18 and engage on the inner wall of the plate 19

The entire device may be manufactured by injection molding of polymer such as polypropylene and may be preferably have letters which may be molded directly into the face thereof. The device as may be readily seen is easily attached into the coin slot by pressing the same therein, the flexible tabs contracting upon entry and then expanding when fully inserted a distance between the locking portions and the bottom of the plate surface by being chosen to be the proper dimension for insertion through the chrome colored face plate of the pay telephone station and the rear inner wall thereof. With most telephones, this dimension is on the order of 0.33" and the tabs preferably have a thickness of 0.093".

I claim:

1. A coin slot cover for telephones in which the telephone is provided with a slot opening in the outer case thereof that communicates with an internal slot at the entrance to the coin chute, the cover comprising a plate defined by a bottom and face surface, said plate having a pair of tabs, said tabs lying in the same plane and extending perpendicular to the bottom surface of the plate, the terminal portion of the tabs having locking portions on the outer edges of the tabs whereby the tabs of the cover may be inserted in a coin slot and will be retained therein by the locking portion engaging the inner surface of the slot and will maintain the plate covering the slot, the face surface of the plate displaying a message.

* * * * *